(12) United States Patent
Ou et al.

(10) Patent No.: US 10,338,843 B2
(45) Date of Patent: Jul. 2, 2019

(54) METHODS FOR MOVING DATA INTERNALLY AND APPARATUSES USING THE SAME

(71) Applicant: Silicon Motion, Inc., Jhubei (TW)

(72) Inventors: Hsu-Ping Ou, Zhubei (TW); Chih-Kang Kung, Kaohsiung (TW)

(73) Assignee: Silicon Motion, Inc., Jhubei (TW)

( * ) Notice: Subject to any disclaimer, the term of this patent is extended or adjusted under 35 U.S.C. 154(b) by 386 days.

(21) Appl. No.: 15/097,785

(22) Filed: Apr. 13, 2016

(65) Prior Publication Data

US 2017/0075624 A1    Mar. 16, 2017

(30) Foreign Application Priority Data

Sep. 11, 2015    (TW) .............................. 104130051 A

(51) Int. Cl.
*G06F 12/10*    (2016.01)
*G06F 3/06*    (2006.01)

(52) U.S. Cl.
CPC .......... *G06F 3/0647* (2013.01); *G06F 3/0619* (2013.01); *G06F 3/0656* (2013.01); *G06F 3/0679* (2013.01)

(58) Field of Classification Search
CPC .............................. G06F 3/0647; G06F 3/0679
USPC ......................................................... 711/103
See application file for complete search history.

(56) References Cited

U.S. PATENT DOCUMENTS

| | | | |
|---|---|---|---|
| 5,860,082 A * | 1/1999 | Smith | G06F 3/0608 711/103 |
| 7,203,791 B2 * | 4/2007 | Lee | G11C 16/102 365/129 |
| 2004/0221092 A1 | 11/2004 | Lee | |

FOREIGN PATENT DOCUMENTS

| | | |
|---|---|---|
| CN | 101996686 A | 3/2011 |
| TW | 200422930 A | 11/2004 |
| TW | 201435730 A | 9/2014 |

OTHER PUBLICATIONS

Office Action of corresponding TW application, published on Jun. 28, 2016.

* cited by examiner

*Primary Examiner* — Jae U Yu
(74) *Attorney, Agent, or Firm* — Wang Law Firm, Inc.

(57) ABSTRACT

A method for moving data internally, performed by a processing unit, including at least the following steps. The processing unit transmits partial copyback read commands to a storage sub-unit through an access interface, where each partial copyback read command is used to direct logic circuits of the storage sub-unit to store partial data of a page of the storage sub-unit in a designated location of a data buffer of the storage sub-unit. The processing unit further transmits a copyback write command to the storage sub-unit through the storage sub-unit for programming the data of the data buffer in a new page of the storage sub-unit.

18 Claims, 10 Drawing Sheets

METHODS FOR MOVING DATA INTERNALLY AND APPARATUSES USING THE SAME

CROSS REFERENCE TO RELATED APPLICATIONS

This Application claims priority of Taiwan Patent Application No. 104130051, filed on Sep. 11, 2015, the entirety of which is incorporated by reference herein.

BACKGROUND

Technical Field

The present invention relates to flash memory, and in particular to methods for moving data internally and apparatuses using the same.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In reality, the NAND flash device always reads from the memory cells and writes to the memory cells complete pages. After a page of data is read from the array into a buffer inside the device, the host can access the data bytes or words one by one by serially clocking them out using a strobe signal.

If the data in some of the pages of the block are no longer needed (also called stale pages), only the pages with good data in that block are read and rewritten into another previously erased empty block. Then the free pages and the stale pages are available for new data. This is a process called garbage collection. The process of garbage collection involves reading data from the flash memory and rewriting data to the flash memory. It means that a flash controller first requires a read of the whole block, and then a write of the parts of the block which still include valid data. This significantly consumes the bandwidth of an access interface coupled between a flash controller and storage units, leading to a performance reduction of the whole system. Conventionally, the flash controller issues copyback read commands to direct a logic circuit of a storage unit to take good data from pages and move to a data buffer thereof and issues copyback write commands to direct the logic circuit thereof to take good data from the data buffer thereof and program to another empty block, without moving the good data from/to the storage unit via the access interface. However, if good data and stale data are included in the same page, the copyback read commands and the copyback write commands cannot work. The flash controller still needs to read pages from the storage unit through the access interface, collects good data from the read pages and rewrite the good data in pages to another empty block of the storage unit through the access interface. Accordingly, what is needed are methods for moving data internally and apparatuses that use these methods to overcome the above drawbacks.

BRIEF SUMMARY

An embodiment of the invention introduces a method for moving data internally, performed by a processing unit, including at least the following steps. The processing unit transmits partial copyback read commands to a storage sub-unit through an access interface, where each partial copyback read command is used to direct logic circuits of the storage sub-unit to store partial data of a page of the storage sub-unit in a designated location of a data buffer of the storage sub-unit. The processing unit further transmits a copyback write command to the storage sub-unit through the storage sub-unit for programming the data of the data buffer in a new page of the storage sub-unit.

An embodiment of the invention introduces an apparatus for moving data internally including at least an access interface coupled to a storage sub-unit, and a processing unit. The processing unit transmits a partial copyback read command to the storage sub-unit through the access interface to direct logic circuits of the storage sub-unit to store partial data of a page of the storage sub-unit in a designated location of a data buffer of the storage sub-unit.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
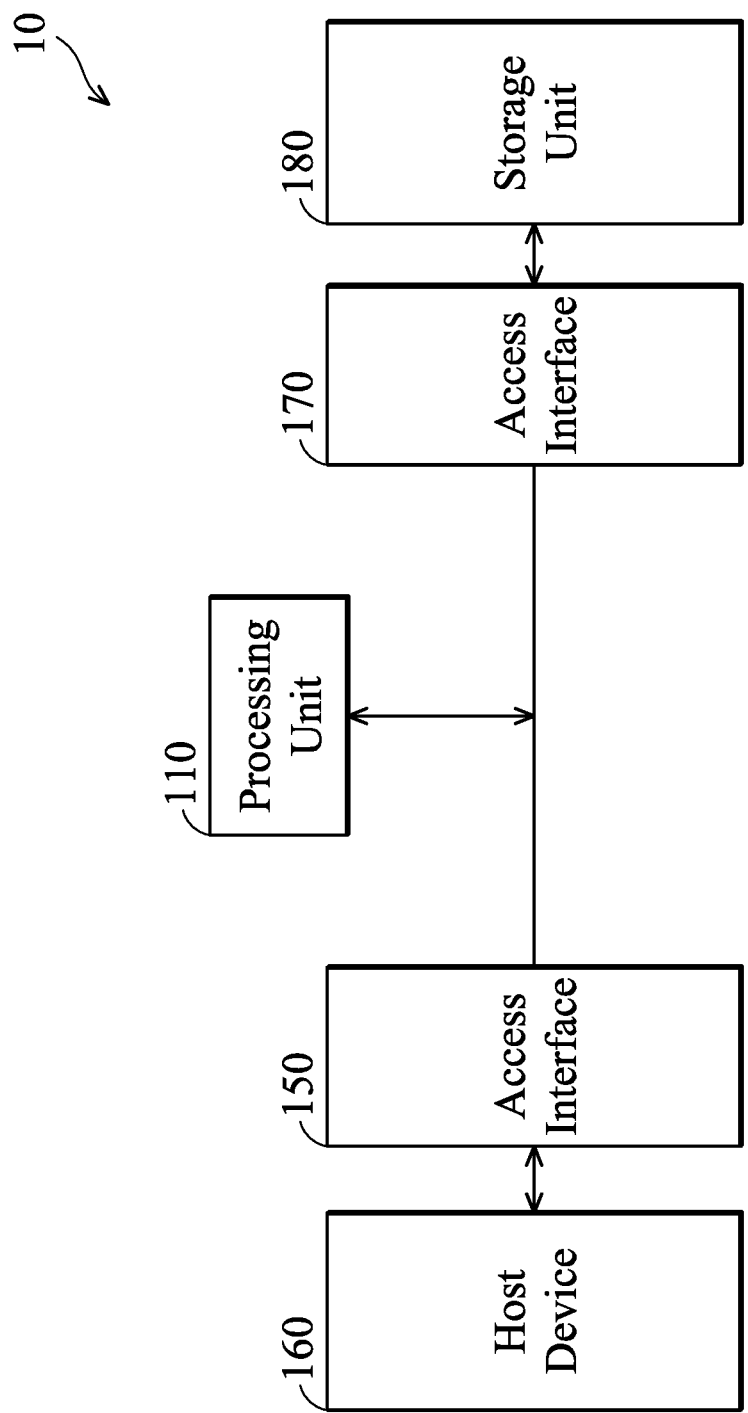
FIG. 1 is the system architecture of a flash memory according to an embodiment of the invention.

FIG. 1 is the system architecture of a flash memory according to an embodiment of the invention. The system architecture 10 of the flash memory contains a processing unit 110 being configured to write data into a designated address of a storage unit 180, and read data from a designated address thereof. Specifically, the processing unit 110 writes data into a designated address of the storage unit 10 through an access interface 170 and reads data from a designated address thereof through the same interface 170. The system architecture 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a SDR (Single Data Rate) protocol or a DDR (Double Data Rate) protocol, such as ONFI (open NAND flash interface), DDR toggle, or others. The processing unit 110 may communicate with the host device 160 through an access interface 150 using a standard protocol, such as USB (Universal Serial Bus), ATA (Advanced Technology Attachment), SATA (Serial ATA), PCI-E (Peripheral Component Interconnect Express) or others.

Figure 2:
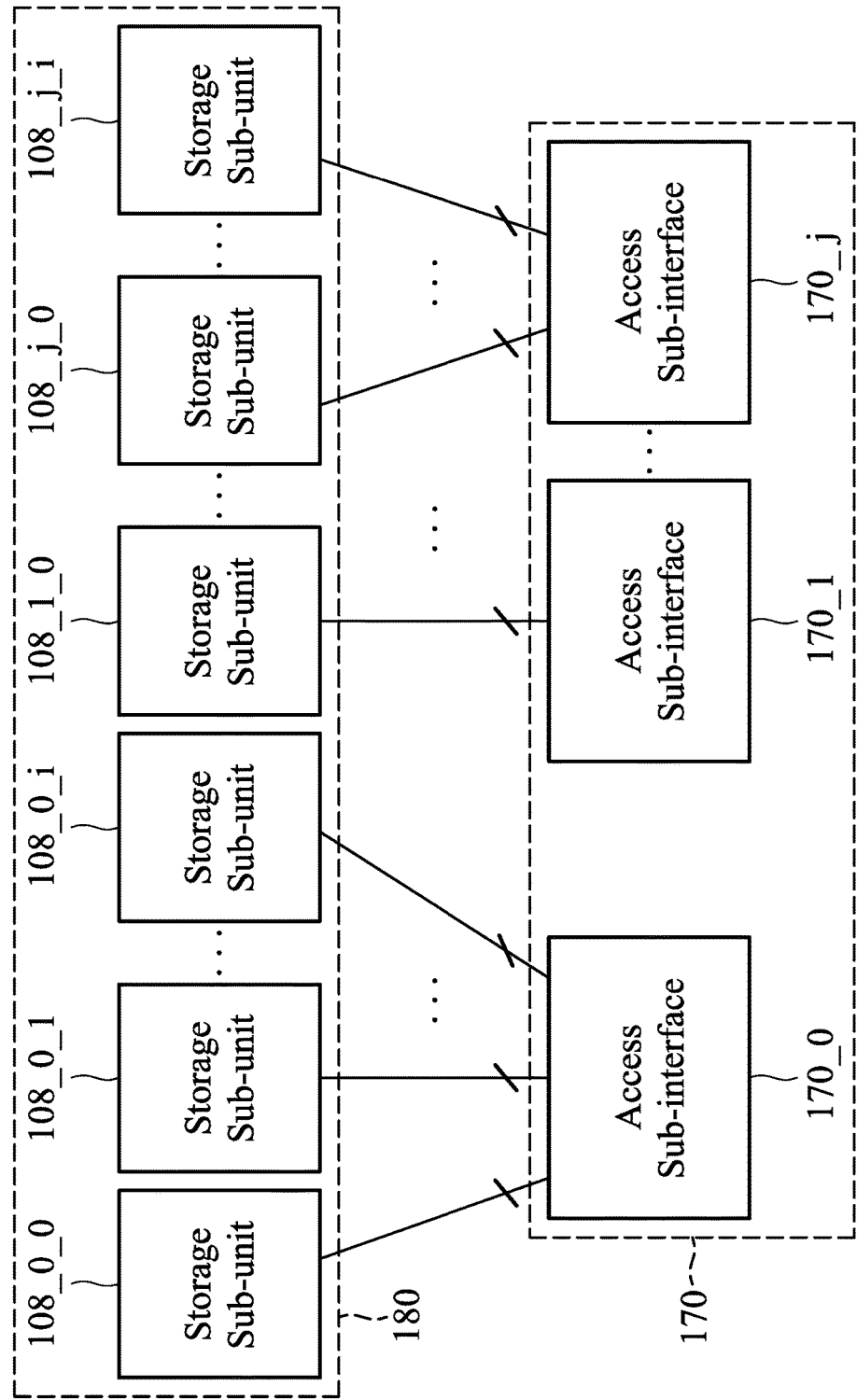
FIG. 2 is a schematic diagram illustrating interfaces to storage units of a flash storage according to an embodiment of the invention.
Figure 3:
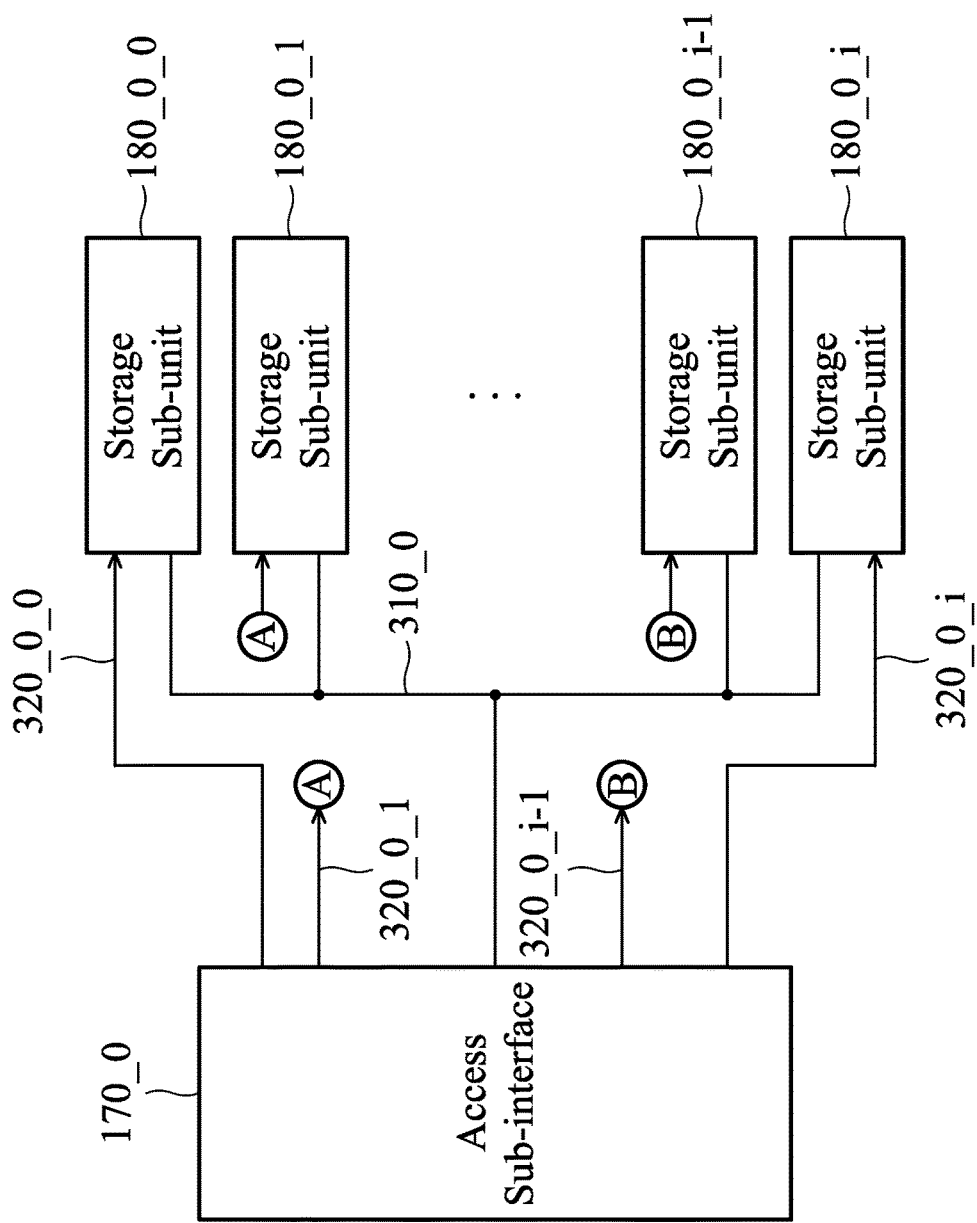
FIG. 3 is a schematic diagram depicting connections between one access sub-interface and multiple storage sub-units according to an embodiment of the invention.

The storage unit 180 may contain multiple storage sub-units and each storage sub-unit may be practiced in a single die and use an access sub-interface to communicate with the processing unit 110. FIG. 2 is a schematic diagram illustrating interfaces to storage units of a flash storage according to an embodiment of the invention. The flash memory 10 may contain j+1 access sub-interfaces 170_0 to 170_j, where the access sub-interfaces may be referred to as channels, and each access sub-interface connects to i+1 storage sub-units. That is, i+1 storage sub-units may share the same access sub-interface. For example, assume that the flash memory contains 4 channels (j=3) and each channel connects to 4 storage sub-units (i=3): The flash memory 10 has 16 storage sub-units 180_0_0 to 180_j_i in total. The control unit 110 may direct one of the access sub-interfaces 170_0 to 170_j to read data from the designated storage sub-unit. Each storage sub-unit has an independent CE control signal. That is, it is required to enable a corresponding CE control signal when attempting to perform data read from a designated storage sub-unit via an associated access sub-interface. It is apparent that any number of channels may be provided in the flash memory 10, and each channel may be associated with any number of storage sub-units, and the invention should not be limited thereto. FIG. 3 is a schematic diagram depicting connections between one access sub-interface and multiple storage sub-units according to an embodiment of the invention. The processing unit 110, through the access sub-interface 170_0, may use independent CE control signals 320_0_0 to 320_0_i to select one of the connected storage sub-units 180_0_0 and 180_0_i, and then read data from the designated location of the selected storage sub-unit via the shared data line 310_0.

Figure 4:
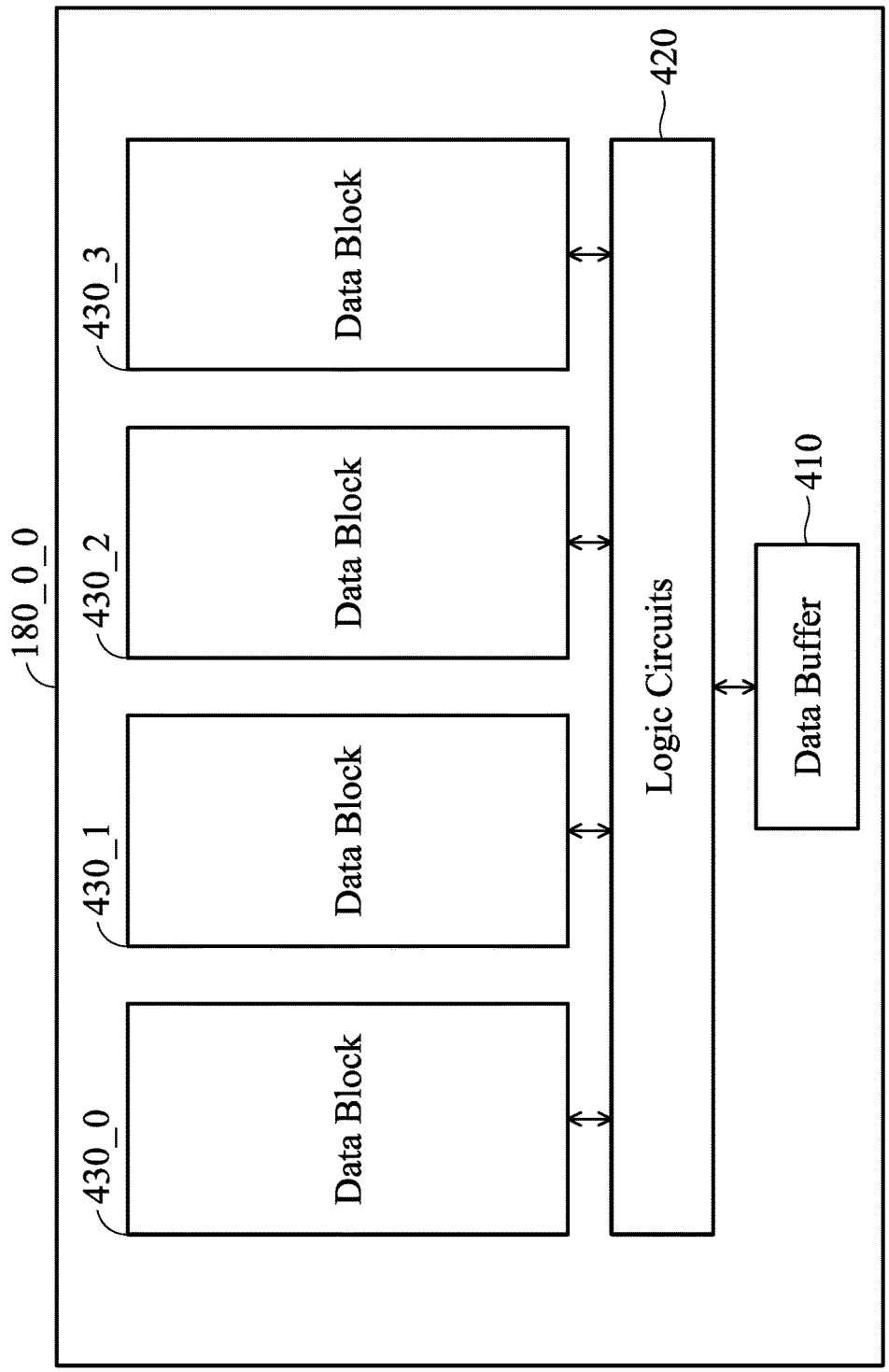
FIG. 4 is a block diagram of a storage sub-unit according to an embodiment of the invention.
Figure 5:
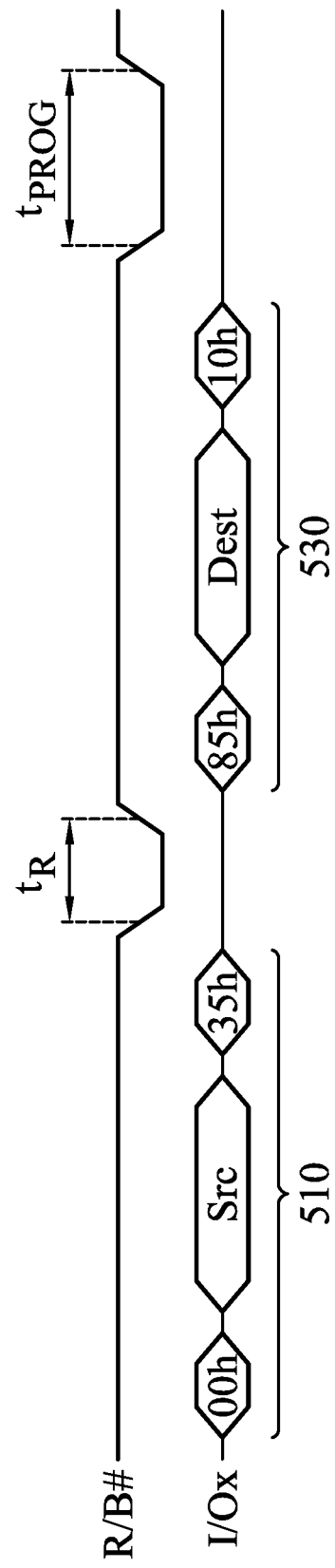
FIG. 5 is a schematic diagram illustrating a copyback read command and a copyback write command according to an embodiment of the invention.

FIG. 4 is a block diagram of a storage sub-unit according to an embodiment of the invention. For example, the storage sub-unit 180_0_0 contains four blocks 430_0 to 430_3, where each block may store data of multiple pages and each page may store data of multiple sections. The length of one section is the minimum unit managed by the host device 160, such as 2K, 4K, 8K bytes, etc. FIG. 5 is a schematic diagram illustrating a copyback read command and a copyback write command according to an embodiment of the invention. For garbage collection in pages, one copyback read (00h-35h) command 510 is used in conjunction with one copyback write (85h-10h) command 530. First, 00h is written to a command register of the logic circuits 420 via the data line 410_0, and then a source address is written in 5 clock cycles. After the address is input, the 35h is written to the command register thereof, leading to a transfer of a particular page from one block into a data buffer 410 by the logic circuits 420. After the copyback read (00h-35h) command 510 has been issued and R/B# goes HIGH, the copyback write (85h-10h) command 530 can be written to the command register thereof. The copyback write (85h-10h) command 530 is used to transfer the data from the data buffer 410 to a data register of the logic circuits 420 and a programming of the new destination page begins. The sequence: 85h, destination address (5 cycles), then 10h, is written to the storage sub-unit 180_0_0 via the data line 410_0. After 10h is written, R/B# goes LOW while the logic circuits 420 programs the new page.

Figure 6:
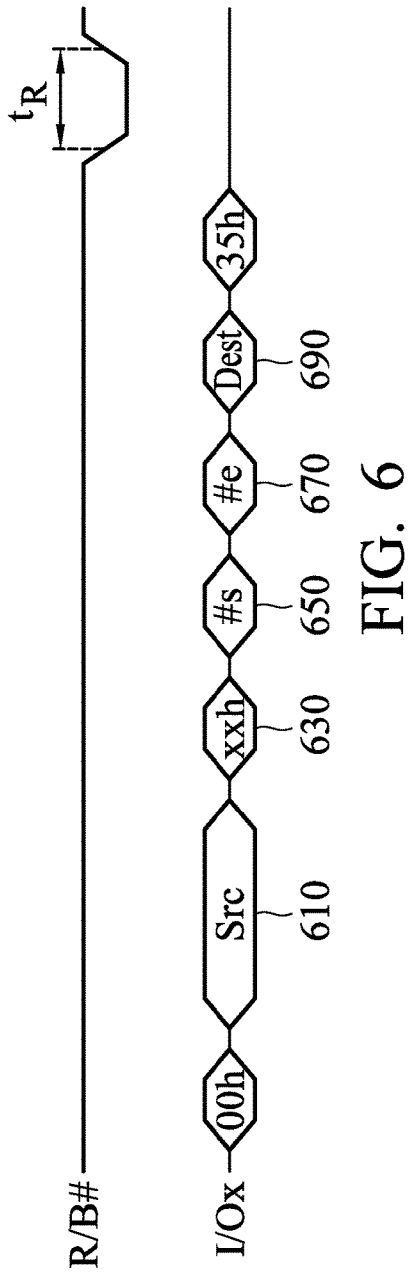
FIGS. 6 to 9 are schematic diagrams illustrating partial copyback read (00-xx-35h) commands according to embodiments of the invention.
Figure 7:
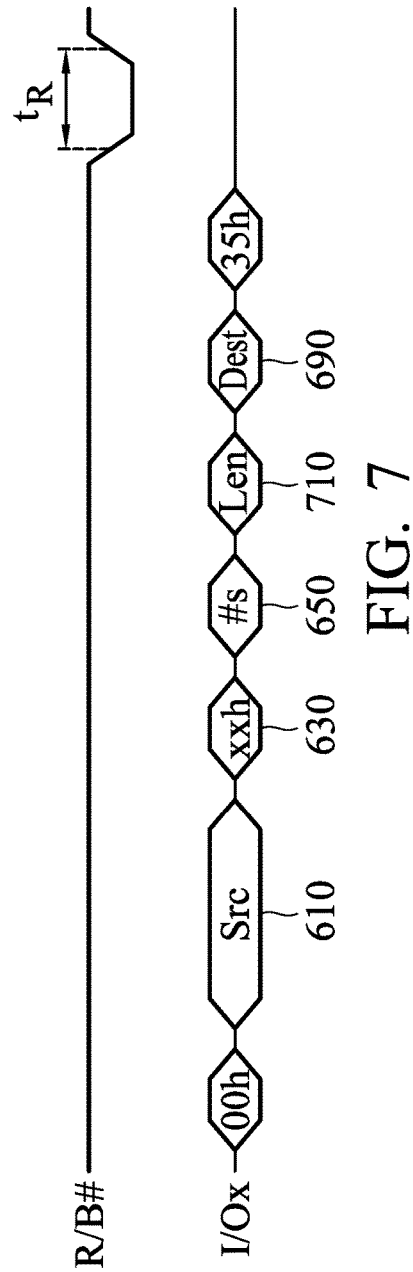

A page may contain good and stale data through several times of access. To address the aforementioned drawbacks, embodiments of the invention introduce a partial copyback read command to direct the logic circuits 420 of the storage sub-unit 180_0_0 to obtain data of a particular section of a particular page and move the data to a particular location of the data buffer 410. The following examples introduce several partial copyback read commands. FIGS. 6 to 9 are schematic diagrams illustrating partial copyback read (00-xx-35h) commands according to embodiments of the invention. Refer to FIG. 6, the processing unit 110 writes the 00h to the command register of the logic circuits 420 through the data line 310_0 of the access sub-interface 170_0, and then, writes the source address 610 in 5 clock cycles. The 00h is the read instruction code. The source address 610 contains a block number (2 clock cycles) and a page number (2 clock cycles). After writing the source address 610, the processing unit 110 writes the xxh 630 to the command register thereof, where "xx" are two arbitrary hexadecimals indicating the partial copyback read instruction code. After writing the xxh, the processing unit 110 writes a start column (2 clock cycles) 650, an end column (2 clock cycles) 670 and a destination address (2 clock cycles) 690 in sequence. The start column 650 and the end column 670 carry respective column numbers to indicate the column range of the source page to be read. The destination address 690 contains a column number indicating the start column of the data buffer 410 to be stored. Finally, the processing unit 110 writes the 35h to the command register thereof, thereby enabling the logic circuits 420 to transmit data of the column range of a particular block page to the designated location of the data buffer 410. The 35h indicates a confirmation of the copyback read command. The partial copyback read command, similar to that of FIG. 5, starts with "00h" and ends with "35h", which has backward compatibility to the copyback read command. The partial copyback read command of FIG. 7 is derived from FIG. 6. After writing "xxh", the processing unit 110 may sequentially write the start column (2 clock cycles) 650 and the length (2 clock cycles) 710 through the data line 310_0 of the access sub-interface 170_0 to indicate the column range of the source page to be read.

Figure 8:
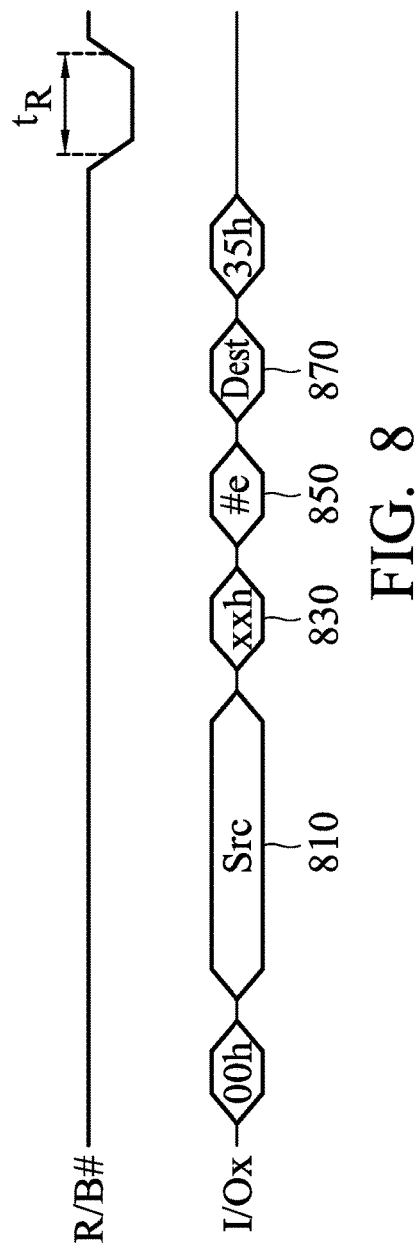
Figure 9:
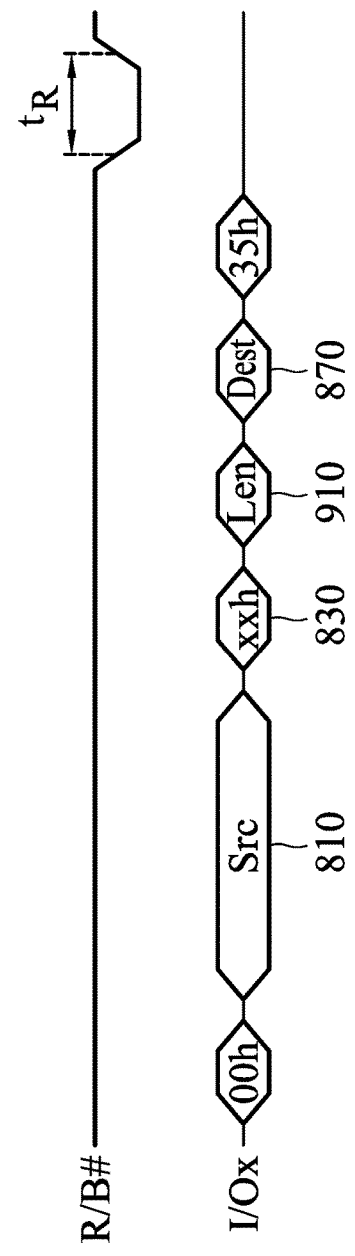

Refer to FIG. 8, the processing unit 110 writes "00h" to the command register of the logic circuits 420 through the data line 310_0 of the access sub-interface 170_0, and then, writes the source address 810 in 6 clock cycles. The source address 810 contains a block number (2 clock cycles), a page number (2 clock cycles) and a start column number (2 clock cycles). After writing the source address 810, the processing unit 110 writes "xxh" 830 to the command register thereof, where "xx" are two arbitrary hexadecimals indicating the partial copyback read instruction code. After writing "xxh" 830, the processing unit 110 writes an end column (2 clock cycles) 850 and a destination address (2 clock cycles) 870 sequentially. The end column 850 carries a column number together with the start column number of the source address 810 to indicate a column range of the source page to be read. The destination address 870 contains a column number indicating a start column of the data buffer 410 to be stored. Finally, the processing unit 110 writes "35h" to the command register thereof, thereby enabling the logic circuits 420 to transmit data of the column range of a particular block page to the designated location of the data buffer 410. The partial copyback read command of FIG. 9 is derived from FIG. 8. After writing "xxh" 830, the processing unit 110 may sequentially write the length (2 clock cycles) 910 through the data line 310_0 of the access sub-interface 170_0, together with the start column number of the source address 810 to indicate the column range of the source page to be read.

Figure 10:
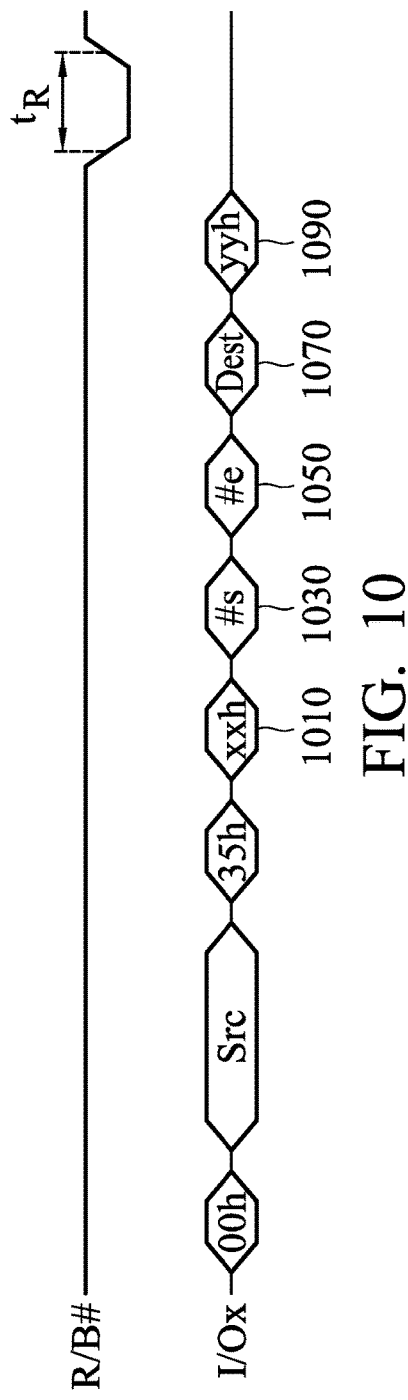
FIGS. 10 to 13 are schematic diagrams illustrating partial copyback read (00-35-xx-yyh) commands according to embodiments of the invention.
Figure 11:
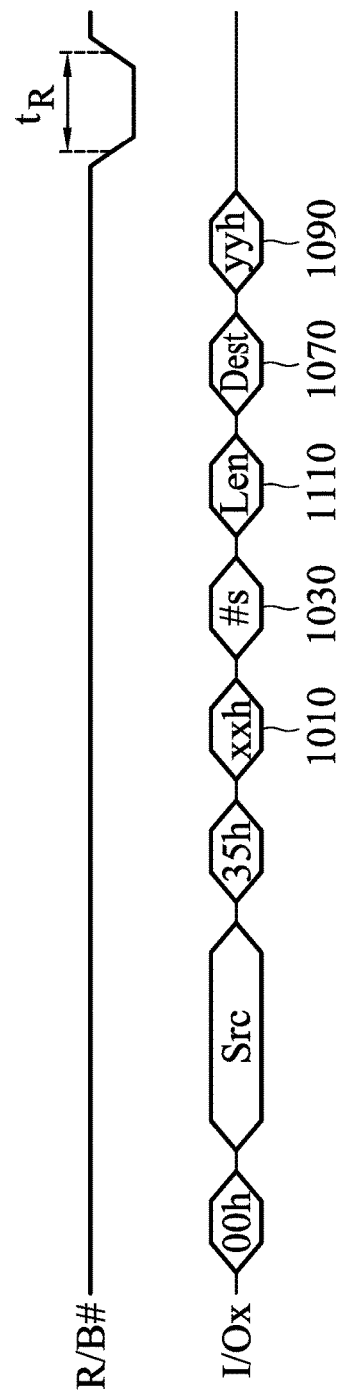

FIGS. 10 to 13 are schematic diagrams illustrating partial copyback read (00-35-xx-yyh) commands according to embodiments of the invention. Refer to FIG. 10. The partial copyback read command contains the copyback read command as shown in FIG. 5 and a proprietary command. In the proprietary command, the processing unit 110 writes "xxh" 1010 to the command register of the logic circuits 420 through the data line 310_0 of the access sub-interface 170_0, where "xx" are two arbitrary hexadecimals indicating the partial copyback read instruction code. Then, the start column (2 clock cycles) 1030, the end column (2 clock cycles) 1050 and the destination address (2 clock cycles) 1070 are sequentially written. The start column 1030 and the end column 1050 contain column numbers respectively to indicate the column range of the source page to be read. The destination address 1070 contains a column number indicating a start column of the data buffer 410 to be stored. Finally, the processing unit 110 writes "yyh" 1090 to the command register thereof, thereby enabling the logic circuits 420 to transmit data of the column range of a particular block page to the designated location of the data buffer 410, where "yy" are two arbitrary hexadecimals. "yyh" 1090 indicates a confirmation of the partial copyback read command. The partial copyback read command of FIG. 11 is derived from FIG. 10. After writing "xxh" 1010, the processing unit 110 may sequentially write the start column (2 clock cycles) 1030 and the length (2 clock cycles) 1110 through the data line 310_0 of the access sub-interface 170_0 to indicate the column range of the source page to be read.

Figure 12:
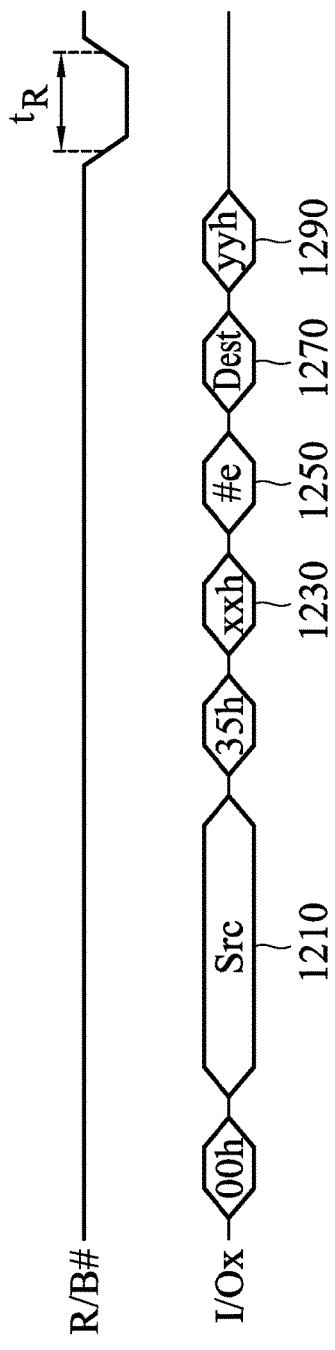
Figure 13:
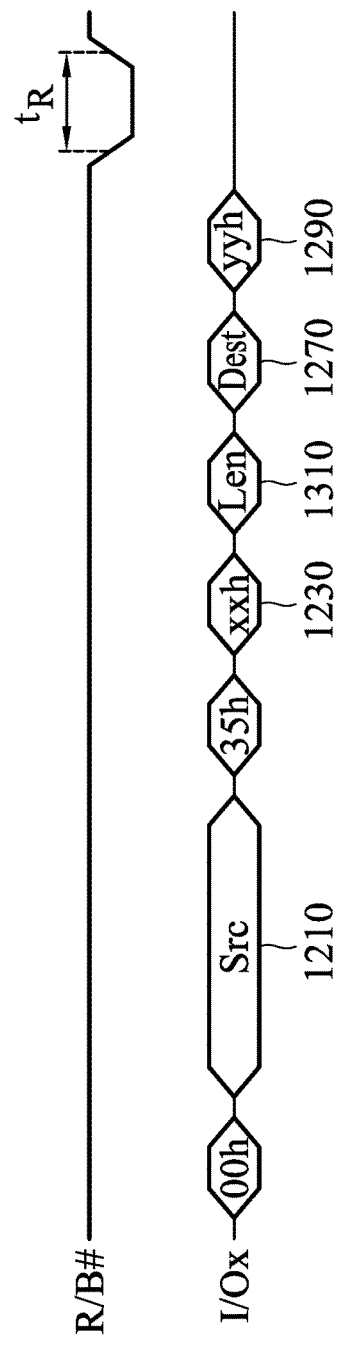

Refer to FIG. 12. The partial copyback read command contains the copyback read command as shown in FIG. 5. However, the source address 1210 contains a block number (2 clock cycles), a page number (2 clock cycles) and a start column number (2 clock cycles). In a proprietary command, the processing unit 110 writes "xxh" 1230 to the command register of the logic circuits 420 through the data line 310_0 of the access sub-interface 170_0, where "xx" are two arbitrary hexadecimals indicating the partial copyback read instruction code. Then, the end column (2 clock cycles) 1250 and the destination address (2 clock cycles) 1270 are sequentially written. The end column 1250 may contain a column number together with the start column number of the source address 1210 to indicate the column range of the source page to be read. The destination address 1270 contains a column number indicating a start column of the data buffer 410 to be stored. Finally, the processing unit 110 writes "yyh" 1290 to the command register thereof, thereby enabling the logic circuits 420 to transmit data of the column range of a particular block page to the designated location of the data buffer 410, where "yy" are two arbitrary hexadecimals. "yyh" 1290 indicates a confirmation of the partial copyback read command. The partial copyback read command of FIG. 13 is derived from FIG. 12. After writing "xxh" 1230, the processing unit 110 may write the length (2 clock cycles) 1310 through the data line 310_0 of the access sub-interface 170_0, together with the start column number of the source address 1210, to indicate the column range of the source page to be read.

Figure 14:
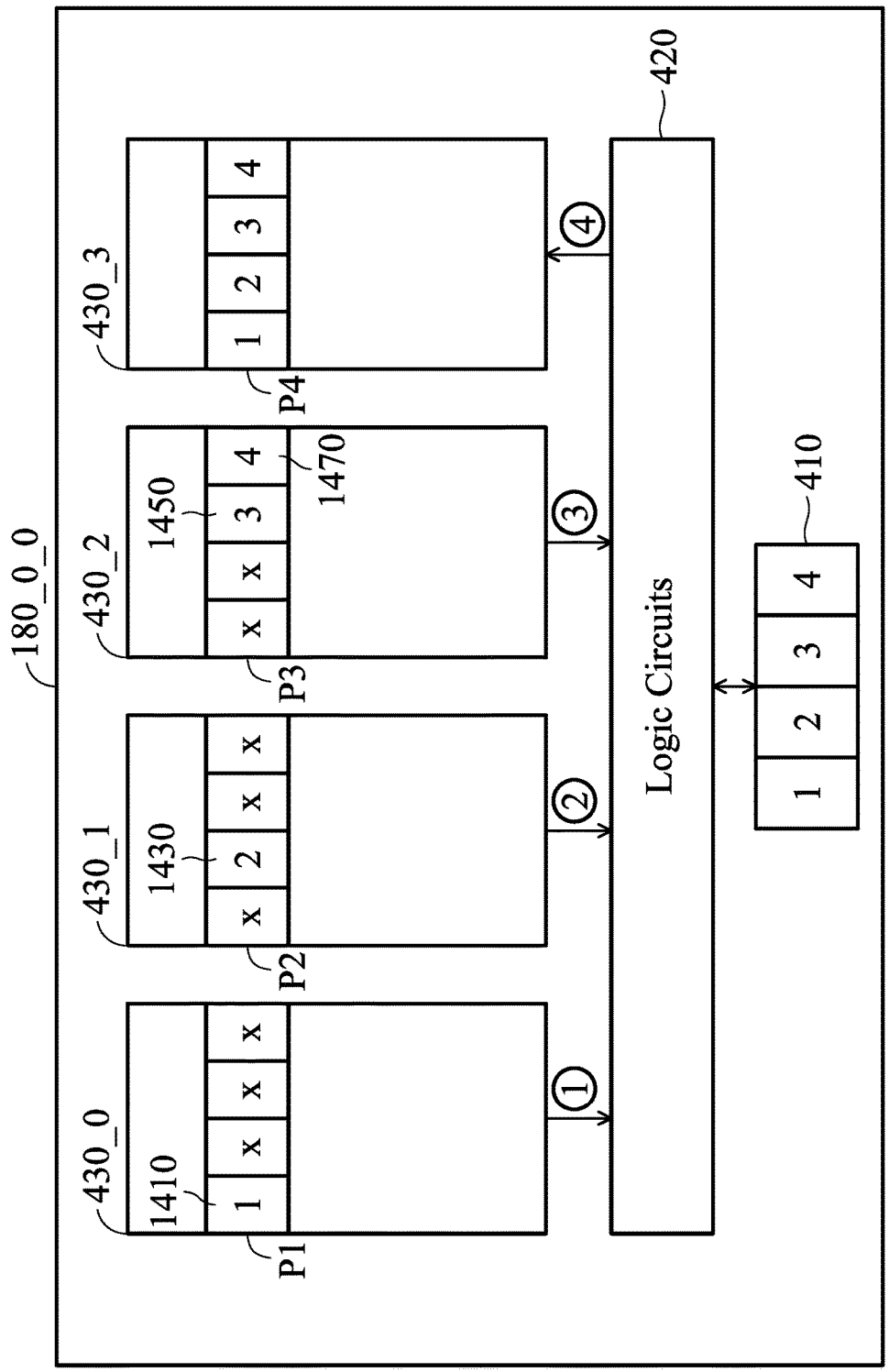
FIG. 14 is a schematic diagram of garbage collection according to an embodiment of the invention.

FIG. 14 is a schematic diagram of garbage collection according to an embodiment of the invention. Assume one page stores data of four sections: Through several times of access, the section 0 of the page P1 of the block 430_0 contains good data and the remaining sections contain stale data. The section 1 of the page P2 of the block 430_1 contains good data and the remaining sections contain stale data. The sections 2 and 3 of the page P3 of the block 430_2 contain good data and the remaining sections contain stale data. In order to collect good data of the pages P1 to P3 in one page so as to store the good data in a new page P4 of the block 430_3, any of the partial copyback read commands as shown in FIGS. 6 to 13 and the copyback read command as shown in FIG. 5 are used. Specifically, the processing unit 110 may transmit the partial copyback read command through the data line 310_0 of the access sub-interface 170_0 to direct the logic circuits 410 to store the data of section 0 of page P1 of block 430_0 in the section 0 of the data buffer 410. Then, two partial copyback read commands are used to direct the logic circuits 420 to store the data of section 1 of page P2 of block 430_1 in the section 1 of the data buffer 410, and the data of sections 2 and 3 of page P3 of block 430_2 in the sections 2 and 3 of the data buffer 410. Finally, the processing unit 110 may transmit the copyback write command through the data line 310_0 of the access sub-interface 170_0 to direct the logic circuits 420 to program the data of the data buffer 410 in the page P4 of the block 430_3.

Although the embodiment has been described as having specific elements in FIGS. 1 to 4, it should be noted that additional elements may be included to achieve better performance without departing from the spirit of the invention. While the process flow described in FIG. 5 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for moving data internally, performed by a processing unit, comprising:
   transmitting a plurality of partial copyback read commands to a storage sub-unit through an access interface, where each partial copyback read command is used to direct logic circuits of the storage sub-unit to store partial data of a page of the storage sub-unit in a designated location of a data buffer of the storage sub-unit; and
   transmitting a copyback write command to the storage sub-unit through the storage sub-unit for programming the data of the data buffer in a new page of the storage sub-unit, wherein the partial copyback read command comprises partial copyback read instruction code, information regarding a column range of the page and a start location of the data buffer.

2. The method of claim 1, wherein the column range of the page is indicated by a start column number and an end column number.

3. The method of claim 2, wherein the partial copyback read command further comprises a source address and the source address comprises a block number, a page number and the start column number.

4. The method of claim 1, wherein the column range of the page is indicated by a start column number and a length.

5. The method of claim 4, wherein the partial copyback read command further comprises a source address and the source address comprises a block number, a page number and the start column number.

6. The method of claim 1, wherein the partial copyback read command starts with a read instruction code and ends with a confirmation of a copyback read command.

7. The method of claim 6, wherein the read instruction code is 00h and the confirmation of the copyback read command is 35h.

8. The method of claim 1, wherein the partial copyback read command comprises a copyback read command and a confirmation of the partial copyback read command, and the partial copyback read instruction code follows the copyback read command.

9. The method of claim 8, wherein the copyback read command starts with a read instruction code and ends with a confirmation of a copyback read command.

10. An apparatus for moving data internally, comprising:
    an access interface, coupled to a storage sub-unit;
    a processing unit, transmitting a partial copyback read command to the storage sub-unit through the access interface to direct logic circuits of the storage sub-unit to store partial data of a page of the storage sub-unit in a designated location of a data buffer of the storage sub-unit, wherein the partial copyback read command comprises partial copyback read instruction code, information regarding a column range of the page and a start location of the data buffer.

11. The apparatus of claim 10, wherein the column range of the page is indicated by a start column number and an end column number.

12. The apparatus of claim 11, wherein the partial copyback read command further comprises a source address and the source address comprises a block number, a page number and the start column number.

13. The apparatus of claim 10, wherein the column range of the page is indicated by a start column number and a length.

14. The apparatus of claim 13, wherein the partial copyback read command further comprises a source address and the source address comprises a block number, a page number and the start column number.

15. The apparatus of claim 10, wherein the partial copyback read command starts with a read instruction code and ends with a confirmation of a copyback read command.

16. The apparatus of claim 15, wherein the read instruction code is 00h and the confirmation of the copyback read command is 35h.

17. The apparatus of claim 10, wherein the partial copyback read command comprises a copyback read command and a confirmation of the partial copyback read command, and the partial copyback read instruction code follows the copyback read command.

18. The apparatus of claim 17, wherein the copyback read command starts with a read instruction code and ends with a confirmation of a copyback read command.

* * * * *